INVENTOR.
GIORGIO SOLI

Feb. 16, 1971  G. SOLI  3,564,588
CHEMILUMINESCENT SYSTEM FOR DETECTING LIVING MICROORGANISMS
Filed July 7, 1964  3 Sheets-Sheet 3
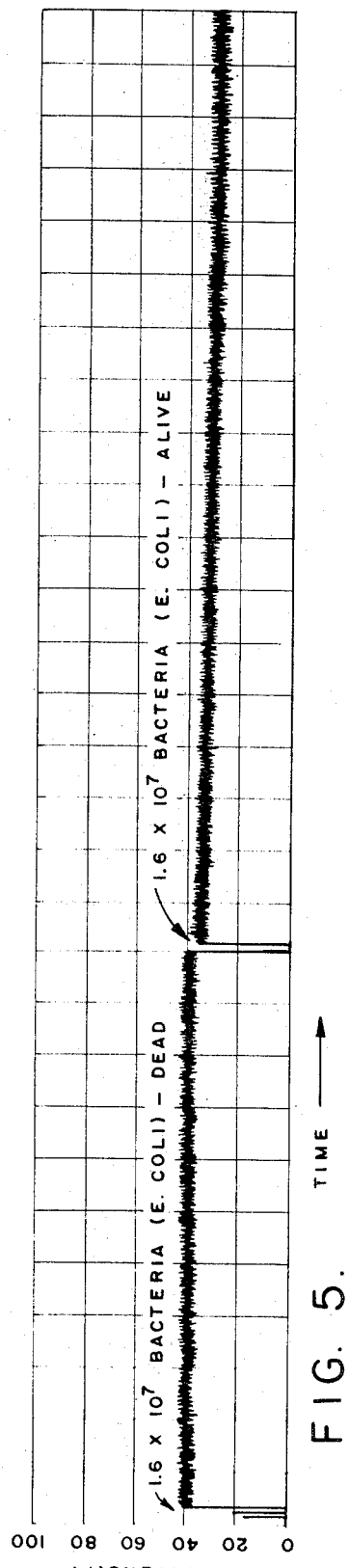
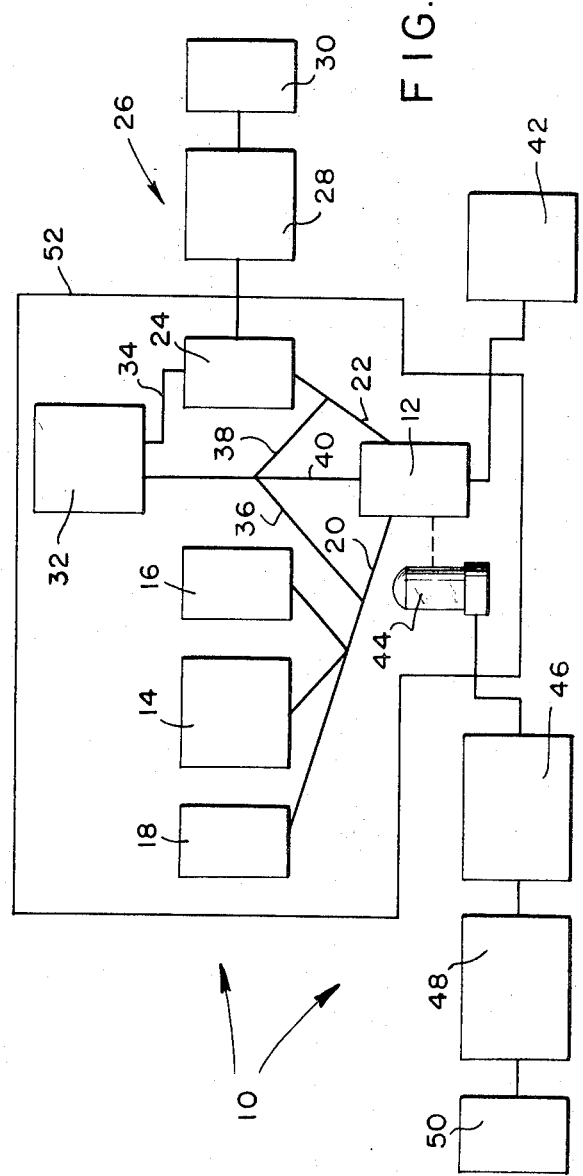
INVENTOR.
GIORGIO SOLI
ATTORNEY.

United States Patent Office 3,564,588
Patented Feb. 16, 1971

3,564,588
CHEMILUMINESCENT SYSTEM FOR DETECTING
LIVING MICROORGANISMS
Giorgio Soli, Los Angeles, Calif., assignor to the United
States of America as represented by the Secretary of
the Navy
Filed July 7, 1964, Ser. No. 380,958
Int. Cl. C12k 1/04
U.S. Cl. 195—103.5        6 Claims

ABSTRACT OF THE DISCLOSURE

A method for detecting living microorganisms in abnormal concentrations and differentiating them from inert matter by taking advantage of the ability of microorganisms to decompose hydrogen peroxide through the enzyme, catalase, which they generate. Therefore, by providing a system containing hydrogen peroxide and a chemiluminescent compound the enzyme decomposes the peroxide thereby activating the chemiluminescent compound which produces a light change and reveals the presence of living microorganisms.

The invention described herein may be manufactured and used by or for the Government of the United States of America for governmental purposes without the payment of any royalties thereon or therefor.

The present invention relates to a system for detecting living microorganisms, and more particularly, to a method for detecting living microorganisms in abnormal concentrations and differentiating them from dead cells or inert matter, the method making use of the light reaction of a chemiluminescent compound in the presence of a peroxide and taking advantage of the ability of microorganisms to decompose the peroxide through the enzyme catalase.

Prior art methods of detection usually employ classical bacteriological procedures, such as exposure of nutrient agar plates to air, or use optical instruments, such as microscopes and, more recently, apparata of the type which respond to particle size or to color through a staining procedure. These methods have the disadvantage that they are too time-consuming or fail to differentiate between living cells and inert matter, thus leading to erroneous results.

It is therefore an object of the present invention to provide a reliable method and system for detecting the presence of living microorganisms.

Another object is the provision of a relatively rapid and efficient method for determining conditions where a check on airborne microorganisms is necessary, such as in hospitals or laboratories.

A further object is the provision of a method and means for determining abnormal concentrations of living microorganisms in areas where the presence of harmful microorganisms is suspected.

The present invention overcomes the disadvantages of the prior art methods by providing means for collecting and impinging air in a liquid, adding a sample of such liquid to a solution of a chemiluminescent compound and a peroxide and measuring the light reaction of the resultant solution.

Other objects, advantages and novel features of the invention will become apparent from the following detailed description of the invention when considered in conjunction with the accompanying drawings wherein:

FIG. 5 is a graph showing the effect on light intensity of adding heat-treated bacterial cells, as well as living bacteria, to a chemiluminescent mixture;

FIG. 7 is a block diagram illustrating schematically one embodiment of the detecting system of the present invention.

Figure 1:
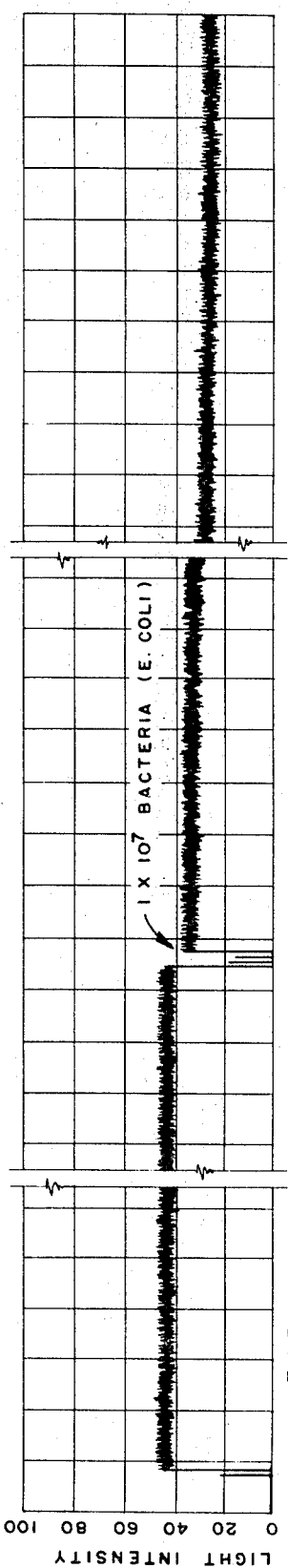
FIG. 1 is a fragmentary graph illustrating the light intensity of a chemiluminescent reaction mixture.

Many natural occurring and synthetic substances exhibit the phenomenon called chemiluminescence, that is, the emission of light whenever these substances are oxidized in the presence of suitable catalysts. Well known among the natural occurring substances is luciferin, present in fireflies and other luminous organisms throughout the animal and plant kingdom. Among the synthetic compounds which have received particular attention are the cyclophthalhydrazides, to which group luminol (3-aminophthalhydrazide) belongs. Lucigenin (dimethyl-diacridinium nitrate) is another chemiluminescent compound which has been investigated. All these synthetic compounds can emit visible light, so-called "coldlight," in the presence of hydrogen peroxide at an alkaline pH, generally with the participation of an organic or metallic catalyst. In the case of lucigenin a catalyst is unnecessary.

Catalas has been shown to be an iron-porphirin protein containing 0.1 percent iron and 15.5 percent nitrogen with a molecular weight between 225,000 and 300,000. It catalyzes the decomposition of hydrogen peroxide into water and molecular oxygen according to the equation:

$$2H_2O_2 \rightarrow 2H_2O + O_2$$

The mode of action of catalase has been investigated and it has been shown that the enzyme is reduced by peroxide and reoxidized by molecular oxygen. It appears that hydrogen peroxide combines with the enzyme and that this complex is decomposed through a series of events in which the ferric form of catalase is reduced to the ferrous form and the enzyme is then reoxidized by the oxygen which is liberated during the reaction:

Catalase $(4F^{+++}) + 2H_2O_2 \rightarrow$ Catalase $(4F^{++}) + 4H^+ + 2O_2$

Catalase $(4F^{++}) + 4H^+ + O_2 \rightarrow$ Catalase $(4F^{+++} + 2H_2O$

Catalase is present in practically all aerobic cells and tissues, and most aerobic and facultative anaerobic bacteria, including pathogens, possess the enzyme. Bacteria have been classified as to their catalase activity and the activity of some of the well known pathogenic bacteria is shown in the following table:

| Organism: | Catalase activity |
|---|---|
| Vibrio comma | Very slight |
| Typhoid-paratyphoid | Slight |
| Hemophilus influenzae | Slight |
| Corynebacterium diphtheriae | Strong |
| Bacillus anthracis | Strong |
| Staphylococcus aureus | Strong |
| Mycobacterium tuberculosis | Strong |
| Brucella | Strong |
| Meningococcus | Strong |
| Gonococcus | Very strong |
| Pseudomonas aeruginosa | Very strong |

It was considered that an enzyme like catalase, being so widespread in nature, quite stable, and with a wide range of pH activity, would provide an efficient tool and, at the same time, be a typical indicator of living matter. This latter consideration is one of primary importance in view of the fact that there is no known system which clearly differentiates between living and non-living matter.

Thus, since so many microorganisms possess the ability of decomposing hydrogen peroxide through the enzyme catalase, thought was given to the possibility of using the light reaction between hydrogen peroxide and a chemiluminescent compound as a means for detecting the living microorganisms. It was theorized that if microorganisms would appear in a system containing the chemiluminescent compound and the peroxide, the enzyme catalase would decompose the peroxide, thereby producing a drop in light intensity and revealing the presence of the organisms.

Pursuing the matter further, light measurement experiments were carried out on chemiluminescent solutions from 2 to 4 ml., in test tubes 100 x 13 mm. which were placed in a dark chamber next to a photomultiplier tube which was part of a microphotometer. In order to increase sensitivity, no filter was used with the photomultiplier tube, the entire emitter spectrum being taken up. Chemiluminescent compounds of the cyclophthalhydrazide type were found to have a peak emission from 420 to 480 millimicrons. Light emission was monitored with a 50 millivolt potentiometer pen recorder; a 1 millivolt recorder was also used to detect minor changes in light decay at low light intensities or at low sensitivity settings of the microphotometer. The chemiluminescent solution, the peroxide solution and the bacterial suspension were all thoroughly mixed before each measurement. Chemiluminescent solutions of different composition were formulated and tested; two chemiluminescent compounds, luminol and lucigenin were used. Several other compounds were also included in the solutions, for different purposes, as will hereinafter appear. Different bacteria were used; *E. coli* being utilized in most of the experiments, although measurements were also made with *Serratia marcescens*, *Chromobacterium violaceum* and *B. subtilis*.

Preliminary experiments were carried out with a system containing luminol from which it was learned that when hydrogen peroxide is added to a system containing luminol and a catalyst, light intensity decays rapidly. This pointed out that a system producing a sustained light reaction was essential before a decay, due to the action of catalase, could become significant. This problem, along with others that required solving, were as follows:

(1) Sustained light output. A system producing a sustained light reaction was essential, before a decay, due to the action of catalase, could become significant.

(2) Intensity of light emitted. It was necessary that the intensity be as great as possible, within relatively low levels, in order to keep electronic noise to a minimum.

(3) Sufficient light output with relatively small amounts of peroxide. The greater the amount of peroxide and the initial light intensity, the greater the decay. Also, it was necessary to have an optimum peroxide concentration for satisfactory catalase activity.

(4) Favorable conditions for catalase activity. These included a pH not exceedingly alkaline (since the optimum pH range for catalase activity is 4–8.5, which requirement for catalase was in conflict with the requirement for luminescence, since most chemiluminescent compounds emit light at alkaline pH from 10 to 12) and the absence of catalase inhibitors in the system.

(5) Light emission (intensity) is temperature-dependent. Necessity for operation at constant temperature, near ambient.

(6) Stability of both chemiluminescent and peroxide solutions. Over a sufficient period of time.

Further experiments were performed with luminol, at various pHs and with different catalysts; all pointed out that the attainment of a stable light reaction was problematical. Lucigenin was then substituted for luminol.

A more stable light reaction was obtained with lucigenin. This compound has the advantage that it does not require a catalyst for light emission, in presence of a peroxide and at alkaline pH. Particular attention was given to its concentration in solution, and to other compounds which were tested for the purpose of increasing light intensity.

It was seen that both Tween 80 (polyoxyethylene derivative of fatty acid partial esters of hexitol anhydrides) and Carbowax 6000 (polyethylene glycol) in the respective concentration of 2 and 10 percent considerably increased light output. Decanal (decyl aldehyde) seemed to somewhat stabilize the light reaction. A system composed of lucigenin, Decanal, Carbowax 6000, Tween 80 and Ammonia (in concentration of 0.2%), unbuffered at a pH of 10.4 proved to be extremely sensitive to small amounts of hydrogen peroxide, down to 0.1 ppm. However, stability of light reaction was unsatisfactory. Better results were obtained by omitting ammonia from the system and by using a Boric acid-KCl-NaOH buffer of pH 10.

The following buffer solutions were tested:

| | pH |
|---|---|
| Bicarbonate-carbonate | 9.6, 9.8 |
| Phosphate buffer | 7.6, 8.0 |
| $H_3BO_3$—KCl—NaOH | 9.0, 10.0 |
| Tris | 7.6, 7.8, 8.0, 8.9 |
| Glycine-Na glycinate | 8.8, 9.2, 9.6, 9.8 |

The $H_3BO_3$—KCl—NaOH buffer was inhibitory for light intensity as compared to the Bicarbonate-carbonate buffer, at equivalent pH values. The Tris and Phosphate buffers yielded practically no light at pH from 7.6 to 8.9. The most effective, as far as light output and stability of light reaction at low pH was the Glycine-Na glycinate buffer which, while producing sufficient light, offered at the same time a more favorable condition for catalase activity.

For the purpose of trying to increase the efficiency of the system, the following peroxides were investigated: Hydrogen peroxide, Na perborate, Cumene hydroperoxide, tert-Butyl hydroperoxide, Succinic acid peroxide, Hydroxyheptyl peroxide, Na peroxicarbonate, and Urea peroxide.

Hydrogen peroxide, Na perborate, Na peroxicarbonate, and Urea peroxide can elicit considerable light. All the water-insoluble peroxides, Cumene, tert-Butyl, Succinic acid and Hydroxyheptyl yield very little or no light with the exception of Hydroxyheptyl peroxide which gave satisfactory results.

With Glycine buffer of pH 8.8, Hydroxyheptyl peroxide, Urea peroxide and Hydrogen peroxide proved to be efficient.

With Hydrogen peroxide or Hydroxyheptyl peroxide, the system is more sensitive to catalase, while with Urea peroxide a greater stability in light emission is obtained. Hydroxyheptyl peroxide produces a very stable light, but of lower intensity.

It was necessary to stabilize the stock solution of the chemiluminescent compound (lucigenin) for both auto-oxidation and bacterial attack, the requirements being always a non-inhibitory action on both light and catalase activity.

Sodium malate was chosen for preventing auto-oxidation of lucigenin over a long period of time. Sodium malate has, in some instances, been used for obtaining DPNH (Diphosphopyridine nucleotide-reduced) from DPN.

Sodium malate appeared to be efficient for keeping lucigenin in the reduced state, at least under condition of storage.

Since lucigenin is a nitrate and sodium malate can be used as a source of carbon by many bacteria, antibacterial agents were used including Acetanilid, Brilliant green and Acetone, to prevent bacterial growth in the chemiluminescent stock solution. The last two proved to be effective, with Acetone appearing to increase the light output of the solution.

Numerous measurements were then carried out, and satisfactory results obtained with the following solutions:

Solution A

Lucigenin—40 mg.
DL-Na malate—125 mg.
Carbowax 6000—10 gr.
Brilliant green—3 mg.
Distilled H₂O—100 ml.

Solution B

Lucigenin—40 mg.
DL-Na malate—125 mg.
Carbowax 6000—10 gr.
Acetone—10 ml.
Distilled H₂O—90 ml.

Both solutions A and B have a pH of 6.5, and they are quite stable over a long period of time.

Two milliliters of the aforementioned solutions were used in the following reaction mixtures:

Reaction mixture A

| | Ml. |
|---|---|
| Solution A | 2 |
| Distilled H₂O | 1 |
| Glycine buffer (pH 8.8) | 0.5 |
| Hydroxyheptyl peroxide (2% butyl alcohol solution) | 0.1 |

Reaction mixture B

| | Ml. |
|---|---|
| Solution B | 2 |
| Distilled H₂O | 1 |
| Glycine buffer (pH 8.8) | 0.5 |
| Hydrogen peroxide (3% sol.) | 0.05 |

Reaction mixture C

| | Ml. |
|---|---|
| Solution B | 2 |
| Distilled H₂O | 1 |
| Glycine buffer (pH 8.8) | 0.5 |
| Urea peroxide (2% sol.) | 0.1 |

Figure 2:
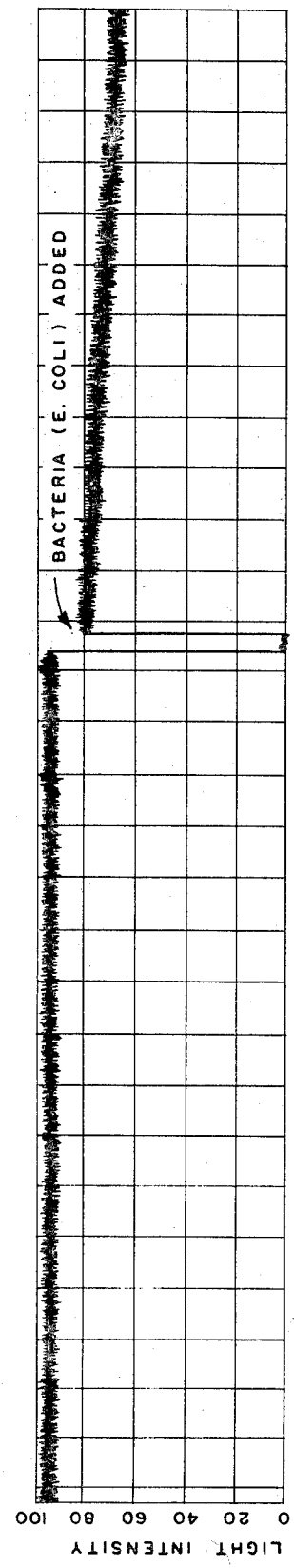
FIG. 2 is a graph showing the light intensity of another chemiluminescent mixture.
Figure 3:
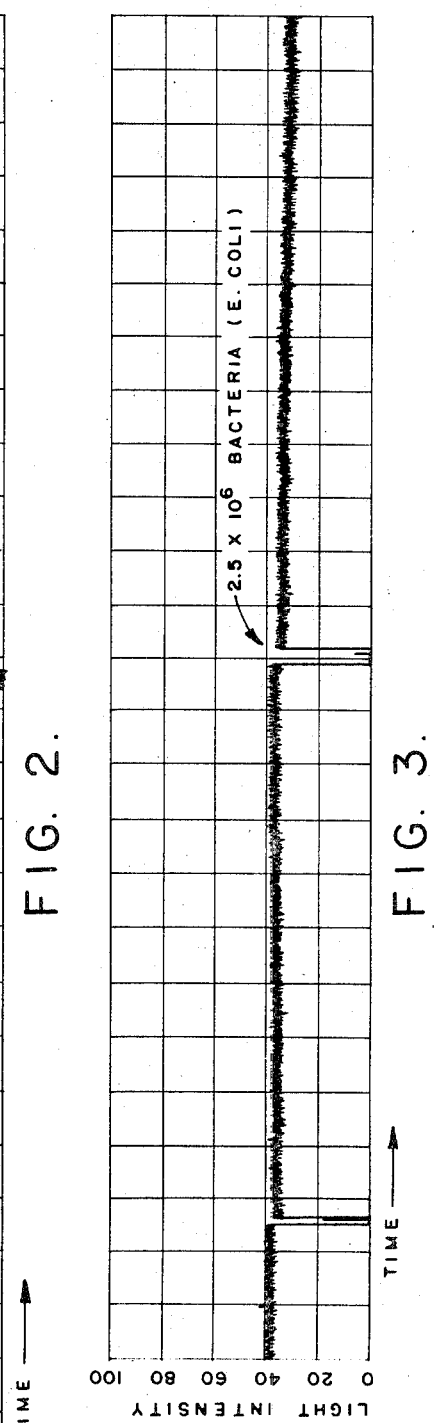
FIG. 3 is a graph showing the light intensity of still another chemiluminescent mixture.

Reaction mixtures A and C produce a stable light reaction, the intensity of which remains constant for several hours. FIG. 1 is a fragmentary graph illustrating the light intensity of reaction mixture C, which was monitored on the chart recorder for more than five hours. The effect of the addition of bacteria is also shown; note how the light intensity drops off. However, reaction mixture C does not seem to have the sensitivity of either reaction mixture A or B. FIG. 2 shows the light intensity of reaction mixture A and FIG. 3 the light intensity of reaction mixture B, both showing the bacterial effect on light intensity. With these two mixtures (A and B) the system seems to be sensitive to a minimum of 2–3 million bacterial cells (*E. coli* actual number into the system). Under these conditions, a decay in light intensity becomes evident in 10–15 minutes. Smaller concentrations of bacteria may produce a detectable effect, but a longer period of time is required for the effect to become evident.

The following solution, of greater sensitivity and stability, also gave satisfactory results:

Solution C

Lucigenin—40 mg.
Na malate—125 mg.
Thymol—40 mg.
Carbowax 6000—10 gr.
Distilled H₂O—100 ml.

Solution C was used similar to the other solutions to make up the following reaction mixture:

Reaction mixture D

| | Ml. |
|---|---|
| Solution C | 2 |
| Glycine buffer | 0.5 |
| Distilled H₂O | 1 |
| Hydrogen peroxide (0.3% sol.) | 0.5 |

Figure 4:
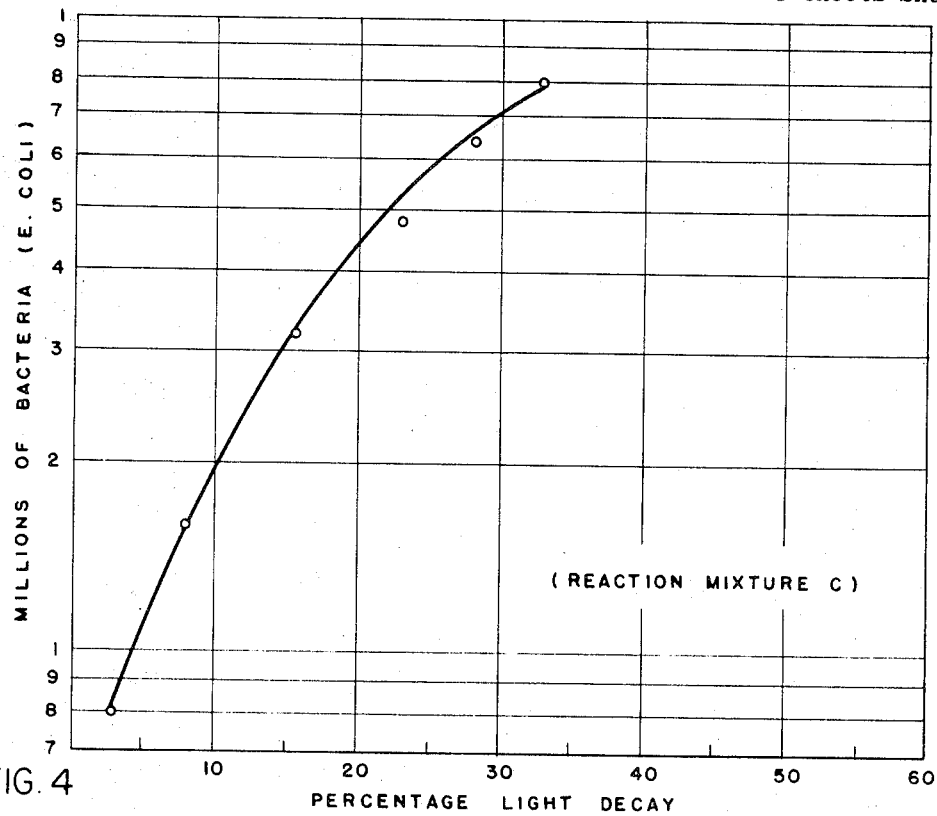
FIG. 4 is a graph on a logarithmic scale showing the decay in light intensity produced by different concentrations of bacteria.

FIG. 4 shows the decay in light intensity produced by different concentrations of bacteria (*E. coli*).

Experiments were also carried out to see whether dead bacterial cells would produce any effect. A suspension of *E. coli* in distilled water was equally distributed in two test tubes, and one of the tubes was heat-treated by placing it in boiling water for twenty minutes. A certain amount (0.1 ml.) of the heat-treated bacterial suspension was added to the chemiluminescent mixture without any detectable effect, while the same amount of the non-treated suspension produced the typical decay in 10–15 minutes; see FIG. 5.

This simple experiment was repeated using separate chemiluminescent solutions with the same results, showing that the system is only sensitive to cells that still possess enzymatic activity and therefore are alive. The system would not respond to dead cells or to inert organic matter.

Figure 6:
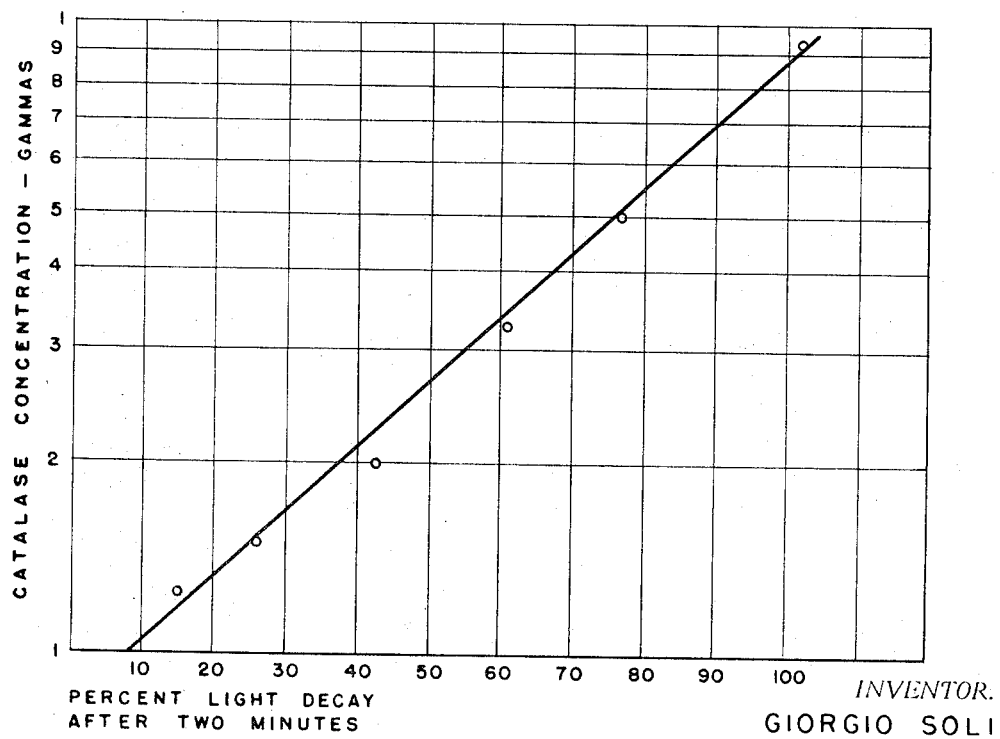
FIG. 6 is a graph on a logarithmic scale showing decay in light intensity with different concentrations of catalase.

Attempts were also made to calibrate the rate of light decay with catalase, in order to measure the amount of catalase per bacterial cell. This was done by monitoring the light decay of the chemiluminescent solution when catalase in different concentration was added to the system by integrating the area under the curve obtained on the chart recorder, and by plotting the values against the catalase concentration. FIG. 6 shows a plot of catalase concentration against percent of light decay. On this basis the amount of catalase per cell of different bacteria was calculated.

The reaction mixtures have been formulated to meet the requirements of the detecting system. The one milliliter of distilled water, which is shown as part of the reaction mixtures, represents an aliquot of the liquid into which the bacteria would be impinged in the system.

FIG. 7 illustrates schematically in block diagram one embodiment of the detecting system, designated generally by numeral 10, which comprises a reaction chamber 12 suitably connected to a source of chemiluminescent solution 14, a source of peroxide solution 16 and a source of buffer solution 18, for introducing a reaction mixture of desired proportions into the chamber by way of a conducting line 20. Also connected to chamber 12 by a conducting line 22 is a container 24 adapted to hold the sample solution to be tested. Container 24 is a part of an impinger, designated generally by numeral 26, which further includes an air pump 28 drawing air through a size discriminator 30 and forcing it into container 24. The discriminator 30 passes only those particles in the air of the size of five microns or less. The air forced into container 24 is caused to impinge upon a liquid, usually distilled (sterile) water drawn from a reservoir 32 via a conducting line 34. Reservoir 32 may also be connected by suitable conducting lines 36, 38 and 40 to conducting lines 20 and 22 and chamber 12, respectively, for the purpose of flushing the same into a solution discard receptacle 42 for disposition as desired. It is understood of course that each conducting line is provided with a suitable control valve, as necessary.

The chamber 12 is provided with a window (not shown) in alignment with which is a photomultiplier tube 44, the tube being part of a photometer 46. The output of photometer 46 controls the operation of a recording or counting means 48 to which an indicating device 50 may be connected to show when the light intensity has dropped to predetermined level.

In order that the detecting system 10 may remain unaffected by temperature changes, parts of the system are enclosed in a housing 52, see FIG. 7, and the temperature therein maintained constant at a temperature of about 25° C.

In the operation of the system, the chemiluminescent solution, peroxide solution and buffer solution are introduced into reaction chamber 12 in amounts to make up a reaction mixture of desired proportions. The photometer 46 and recording means 48 are put into operation for monitoring and measuring the level of light emission of the reaction mixture in chamber 12. Air suspected of containing microorganisms is drawn through size discriminator 30 and impinged upon a liquid in container 24 for a time sufficient to assure a concentration of the microorganisms, if any are present. A sample of the impinged liquid is then drawn off and added to the reaction mixture in the chamber 12 with continued monitoring and measuring of the light emission, a reduction in the light intensity serving to indicate the presence of the enzyme catalase and, therefore, the presence of microorganisms possessing such enzyme.

There has thus been provided a method for detecting living microorganisms, and an apparatus for performing the method, which stated in its simplest terms is as follows:

(a) Measuring the light emission of a chemiluminescent reaction mixture.

(b) Adding a sample to be tested to the mixture.

(c) Measuring the light emission from the new mixture.

Obviously, the method could be used for detecting the presence of living microorganisms in space or on other planets or satellites, as well as on earth, and many modifications and variations of the present invention are possible in light of the foregoing teachings. It is therefore to be understood that within the scope of the appended claims the invention may be practiced otherwise than as specifically described.

What is claimed is:

1. A method for detecting living microorganisms comprising the steps of:
   (a) Measuring the light emission from a mixture of a chemiluminescent solution, a buffer solution and hydrogen peroxide;
   (b) Adding a sample solution suspected of containing living microorganisms of the type possessing the enzyme catalase;
   (c) Measuring the light emission of the resultant mixture.

2. The method of claim 1, wherein:
   said chemiluminescent solution contains lucigenin; and said buffer solution has a pH value of about 8.8.

3. A method for detecting living microorganisms of the type that possess the enzyme catalase, comprising the steps of:

(a) Preparing a chemiluminescent mixture including lucigenin, hydrogen peroxide and a buffer;
   (b) Measuring the light emission from said mixture;
   (c) Preparing a sample solution by impinging air suspected of containing living microorganisms upon a liquid;
   (d) Adding a sample of said solution to said mixture; and
   (e) Measuring the light emission from the resultant mixture to determine any light decay because of the addition of said solution.

4. The method of detecting living microorganisms of the type that possess the enzyme catalase, comprising the steps of:
   (a) preparing a solution comprising:
      (1) 40 mg. lucigenin
      (2) 125 mg. sodium malate
      (3) 10 grams polyethelene glycol
      (4) 100 ml. liquid;
   (b) preparing a mixture comprising:
      (1) 2 ml. of said solution
      (2) 1 ml. distilled $H_2O$
      (3) .5 ml. glycine buffer (pH 8.8)
      (4) .05–5 ml. of 3% sol. $H_2O_2$;
   (c) measuring the light emission from said mixture;
   (d) adding to said mixture a sample of liquid to be tested; and
   (e) measuring the light emission from the resultant mixture.

5. The method of claim 4 wherein:
   said solution further comprises an antibacterial agent.

6. The method of claim 5 wherein:
   said antibacterial agent consists of acetone constituting about one tenth the volume of said liquid.

References Cited

Hastings et al., J. Biol. Chem., vol. 238, pp. 2537–9 and 2553–4 (1963).

Raubut et al. AD610435, Chemiluminescent Materials, American Cyanamid Co., Technical Report No. 6, Sept. 1 to Nov. 30, 1964, pp. 7 and 10–13.

LELAND A. SEBASTIAN, Primary Examiner

U.S. Cl. X.R.
23—230; 252—188.3